United States Patent [19]

Mol et al.

[11] 3,830,988

[45] Aug. 20, 1974

[54] NOISE CANCELING TRANSMITTER

[75] Inventors: Hans Cornelis Mol, Wilton, Conn.; Ranjit Biswas, East Orange, N.J.; Bernard Frank Kloek, Brooklyn, N.Y.

[73] Assignee: Roanwell Corporation, New York, N.Y.

[22] Filed: Dec. 21, 1972

[21] Appl. No.: 317,241

[52] U.S. Cl. .................................. 179/187, 179/1 P

[51] Int. Cl. ........................................... H04m 1/19

[58] Field of Search ....... 179/187, 1 P, 1 FS, 121 D, 179/179, 103, 1 DM

[56] References Cited

UNITED STATES PATENTS 3,733,441 5/1973 McCorkle et al. ................ 179/81 B

FOREIGN PATENTS OR APPLICATIONS 473,515 7/1969 Switzerland ..................... 179/121 D

*Primary Examiner*—Thomas W. Brown

*Attorney, Agent, or Firm*—Cooper, Dunham, Clark Griffin & Moran

[57] ABSTRACT

A noise canceling transmitter including a directionally sensitive microphone asymmetrical with respect to a mounting flange adapted to engage a supporting surface and insertable in a telephone handset as a replacement for a directionally insensitive conventional transmitter symmetrical with respect to said supporting surface. The transmitter assembly of the invention includes an annular contact and a central contact which engages two spring contacts within the handset, regardless of the orientation of the transmitter assembly. Orientation control means are provided to limit relative rotation of the replacement assembly with respect to the handset casing so as to maintain it within a predetermined range of orientation, where its noise cancelling characteristic is effective. A retainer ring holds the mounting flange in place on the handset casing. The ring is threadedly engaged with the casing.

10 Claims, 20 Drawing Figures

NOISE CANCELING TRANSMITTER

BRIEF SUMMARY OF THE INVENTION

The directionally sensitive transmitter assembly includes a peripheral flange for engaging the casing of the handset and the lip of a conventional contact supporting cup on a telephone handset. An extension projects downwardly from the bottom of the assembly and is spaced radially from the axis of the cup when the peripheral flange is engaging the lip. A directionally sensitive microphone in the transmitter assembly is asymmetrical with respect to the cup axis when the flange is engaging the lip, and is capable of canceling ambient noise when the assembly is in a predetermined range of orientation with respect to the cup axis. The transmitter assembly includes an annular contact and a central contact within and spaced from the annular contact and extending downwardly below the extension means to engage spring contacts in the cup when the peripheral flange is engaging the lip. Orientation control means are provided to limit the relative rotation of the cup and the transmitter assembly, so as to maintain the transmitter assembly within its predetermined range of noise canceling orientation. This orientation control means includes the downwardly projecting extension on the assembly and cooperating inward projection means on the cup. A retainer ring is threadedly engageable with the casing and has an inwardly projecting flange co-operating with the peripheral flange on the assembly to hold the latter in place on the casing.

In most modifications, a spacer is used between the cup and the transmitter assembly. In all modifications, the interfitting parts of the orientation control means are made with substantial clearances, or are flexible, so that the replacement transmitter assembly may be used with a wide range of variations of cup dimensions.

DRAWINGS

DETAILED DESCRIPTION

FIGS. 1–9

Figures 1, 2, 3, 4:
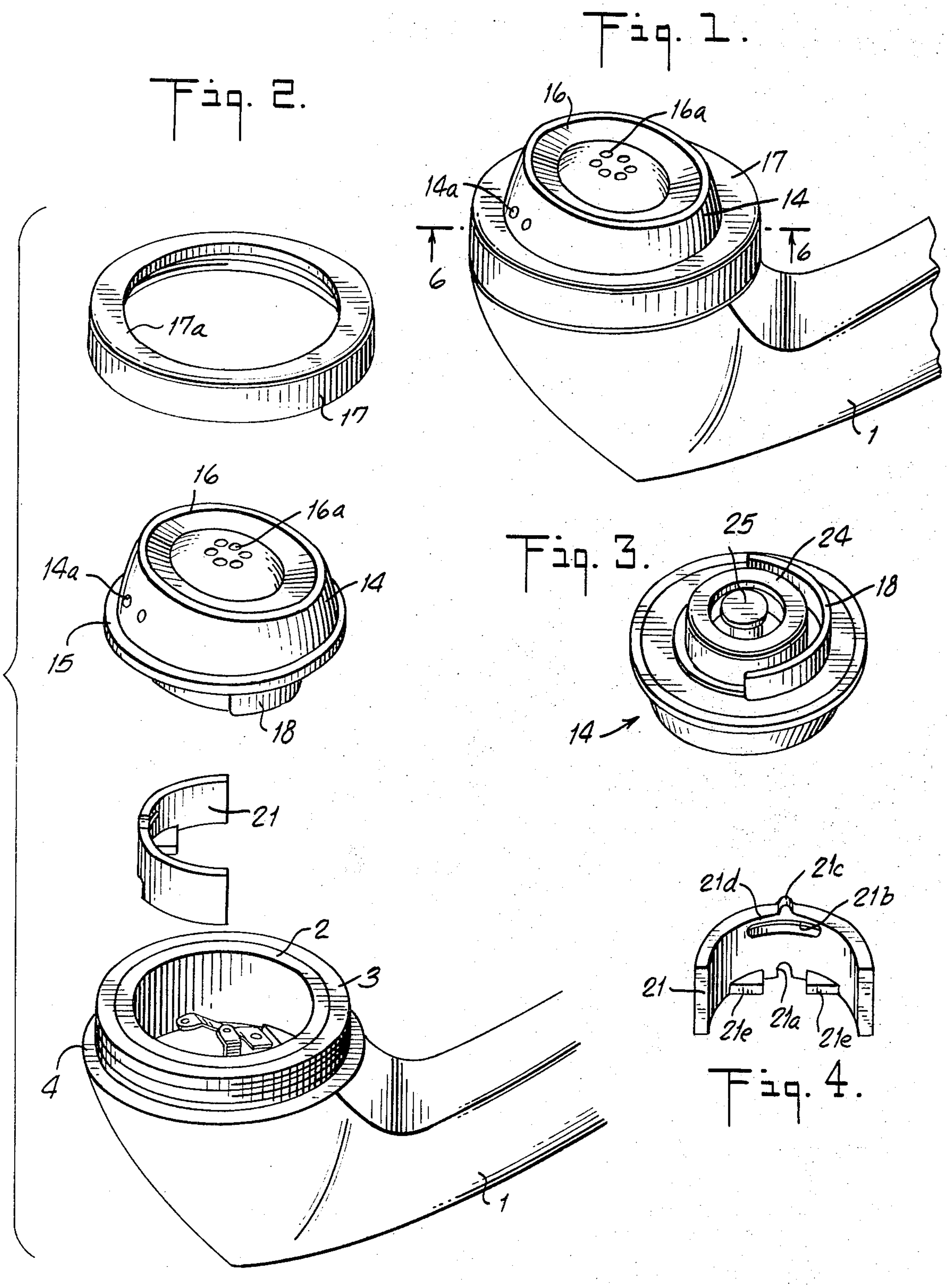
FIG. 1 is a fragmentary view of the transmitter end of a telephone handset, showing a noise canceling transmitter according to the invention assembled thereon.
FIG. 2 is an exploded view, similar to FIG. 1, showing a retainer ring, a directionally sensitive transmitter assembly, an orientation control spacer, all according to the invention, and a conventional handset casing and cup.
FIG. 3 is a bottom perspective view of the transmitter assembly in FIG. 2.
FIG. 4 is a perspective view taken from the right-hand side of FIG. 2, showing the orientation control spacer of FIG. 2.
Figures 5, 8, 9:
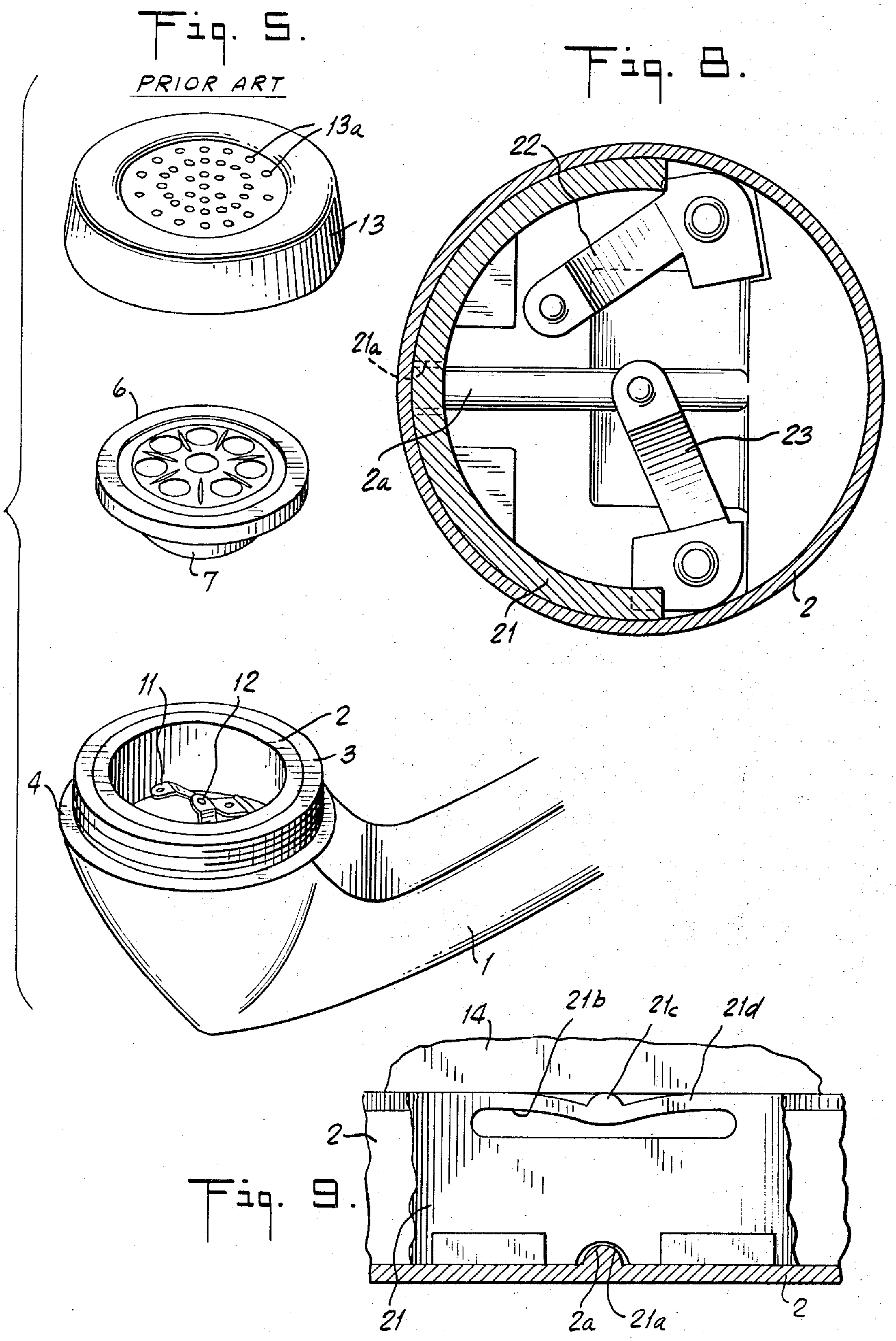
FIG. 5 is a view similar to FIG. 2, showing a conventional transmitter assembly as used in a telephone handset.
FIG. 8 is a sectional view taken along the line 8—8 of FIG. 6.
FIG. 9 is a fragmentary sectional view taken along the line 9—9 of FIG. 6.

FIGS. 1, 2 and 5 show, at reference numeral 1, the transmitter end of a conventional telephone handset. As best seen in FIGS. 2 and 5, the transmitter end of the hand set 1 includes at its transmitter end a contact supporting cup 2 received within a peripheral flange 3 which is threaded on its outer surface and terminates at its lower end at a shoulder 4.

As shown in FIG. 5, the conventional telephone handsets currently in use include a microphone assembly 6 which is symmetrical with respect to its own axis, that axis being coincident with the axis of the cup 2 when the transmitter is assembled. The conventional microphone 6 has at its lower end a pair of coaxial contacts, only the outer ring contact 7 appearing in FIG. 5. These coaxial contacts are adapted to engage respectively a pair of spring contacts 11 and 12 fixed to the bottom of the cup 2. The microphone 6 is readily rotatable within the cup 2, and is held in place by a cover 13 perforated as shown at 13*a* to admit sound and threadedly engageable with the threads on the outside of the flange 3. Tightening of the cover 13 on the flange 3 tends to rotate the microphone 6 within the cup 2, but such rotation does not make any difference in the performance of the microphone 6, since the latter is not directionally sensitive.

Figure 6:
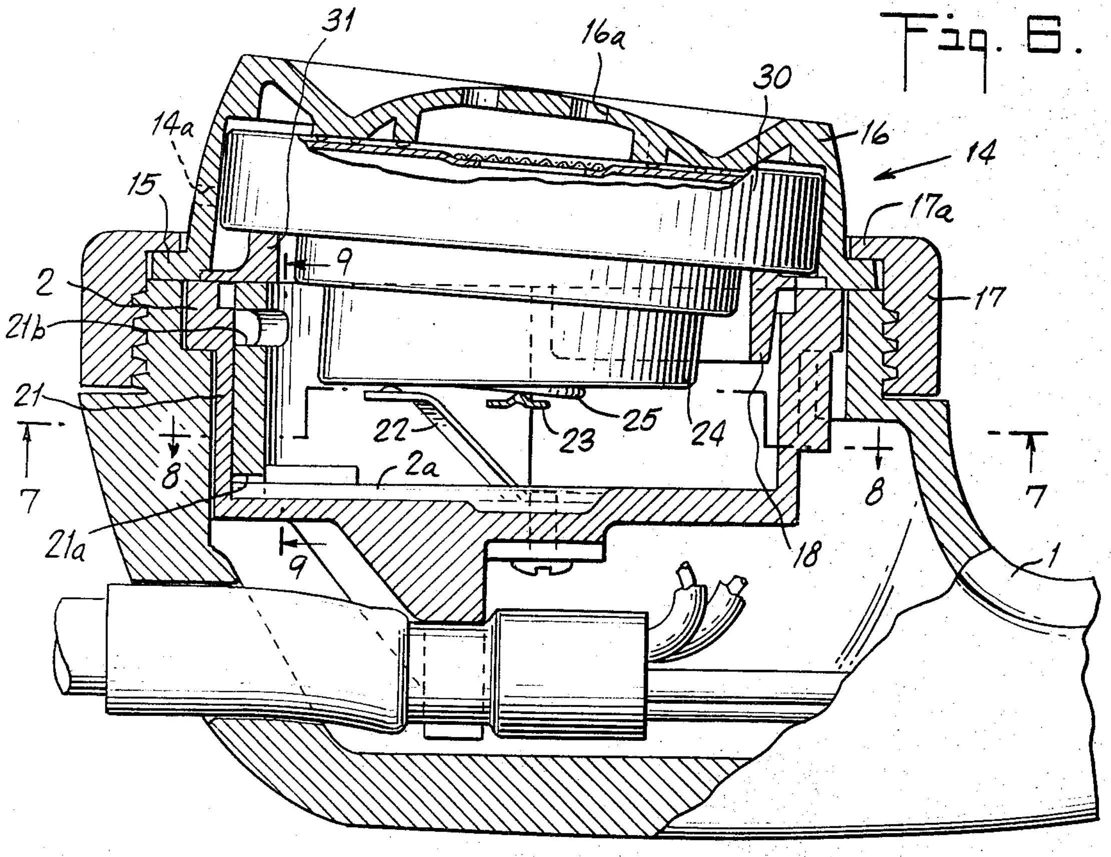
FIG. 6 is a cross-sectional view taken along line 6—6 of FIG. 1.

Turning now to FIG. 2, it may be seen that the directionally sensitive transmitter assembly 14, shown in that figure, has its axis tilted with respect to the axis of the cup 2. The assembly 14 is provided with a peripheral flange 15, which is adapted to rest against the lip of the cup 2, as best seen in FIG. 6. The microphone assembly 14 includes a cover 16 whose axis is tilted with respect to the axis of the flange 15, and which is provided with centrally located apertures 16*a* through which sound may impinge upon the microphone inside the assembly 14. The assembly 14 is provided with a pair of noise canceling apertures 14*a*, through which ambient noise may reach the side of the diaphragm opposite to that where the ambient noise passing through the apertures 16*a* impinges. Thus, the ambient noise impinges on both sides of the diaphragm and is canceled out, whereas the voice of the speaker is directed only through the apertures 16*a* and vibrates the diaphragm. A retainer ring 17 is provided for engaging the flange 15 on the transmitter assembly 14, and holding the flange 15 against the top of the cup 2 and the casing 1. The inside of the ring 17 is threaded to engage the threaded periphery of the flange 3 on the handset 1.

A downward extension 18 of the assembly 14 projects within the cup 2 and is concentric with the axis thereof. The projection 18 need not be exactly concentric with the axis of the cup 2, but a considerable amount of play may preferably be provided, so that the projection 18 fits within a wide range of sizes of cups 2.

A spacer 21 is inserted between the transmitter assembly 14 and the cup 2. The spacer 21 has in its bottom surface a groove 21*a* adapted to engage the sides of a ridge 2*a* formed in the bottom of the cup 2. Such ridges 2*a* are standard in one widely used type of cup on conventional telephone handsets.

The spacer 21 is provided with a slot 21*b* parallel to its upper edge and spaced a short distance below that upper edge. The slot 21*b* and the upper edge define a bridge portion 21*d* of the spacer. A protuberance 21c extends upwardly from the bridge portion 21*d* in alignment with the middle of slot 21*b*. The spacer 21 is generally semicylindrical, being preferably made slightly longer than a semicylinder whereas flange 18 is slightly shorter than a semicylinder. When the spacer 21 is received in the cup 2, its ends are spaced slightly from the ends of the flange 18. The spacer 21 is locked against rotation with respect to the cup by engagement of the slot 21*a* with the ridge 2*a*. The ends of the spacer 21 are aligned with the circumferentially opposite ends of the flange 18. If any effort is made to rotate the transmitter assembly 14 with respect to the cup 2, the spacer 21 and the flange 18 cooperate to limit the movement of the directionally sensitive transmitter assembly 14 to its predetermined range of noise canceling orientation, which may be a range of about 10°.

Figure 7:
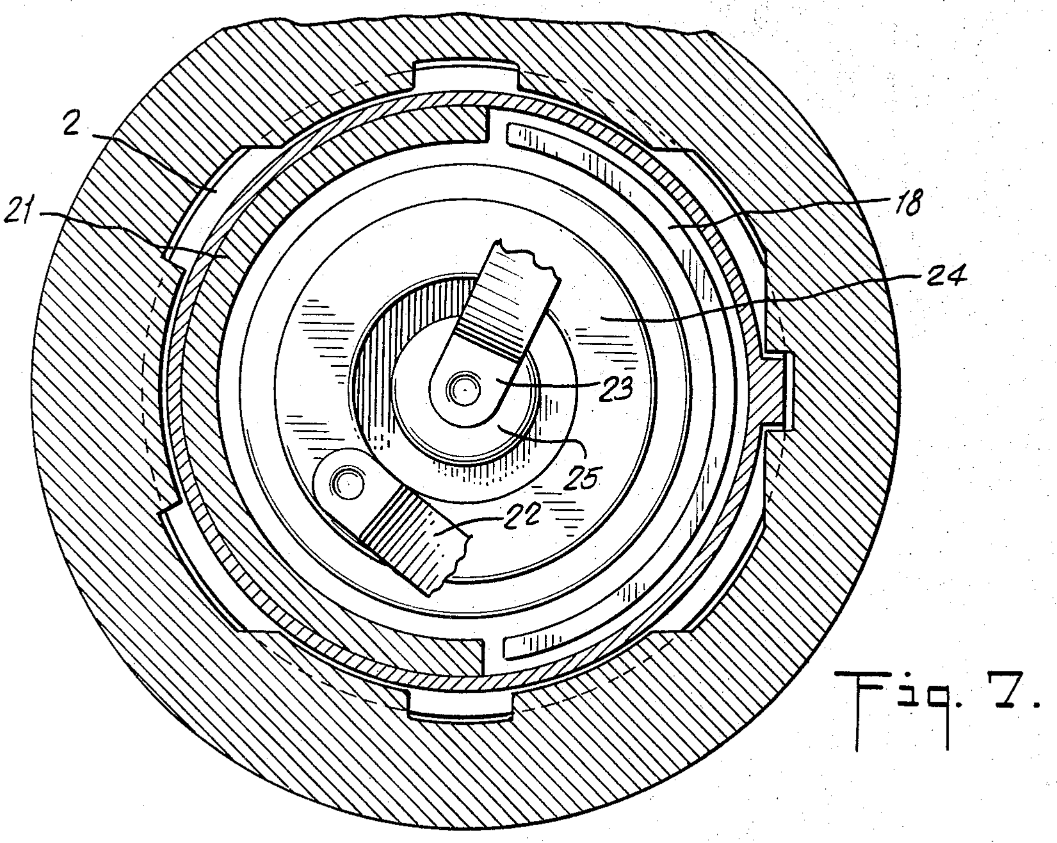
FIG. 7 is a sectional view taken along the line 7—7 of FIG. 6.

Spring contacts 22 and 23, best seen in FIGS. 7 and 8, are fixed to the bottom of the cup 2 and project upwardly therefrom, with the upper end of contact 23 near the center of the cup, and the upper end of contact 22 spaced radially of the cup from contact 23.

After the spacer 21 is inserted in the cup 2 with the ridge 2*a* received in the groove 21*a*, the transmitter assembly 14 is placed on the handset 1 with the flange 18 and the contacts 24 and 25 projecting downwardly into the cup 2. The flange 15 then rests lightly on the lip of the cup 2, which is aligned with the flange 3. The ring 17 is then threaded onto the flange 3, with the inwardly projecting flange 17*a* engaging the flange 15 and forcing the assembly 14 firmly against the lip of the cup 2. This pushes the protuberance 21*c* downwardly, deflecting the bridge portion 21*d* of the spacer 21, as shown in FIG. 9. The bridge portion 21*d* serves as a spring means to maintain the spacer 21 snugly fitting between the cup 2 and the transmitter assembly 14. Various models of handsets may have different depths for the cup 2. This variation in depth is accommodated by providing the slot 21*b* and protuberance 21*c* so that the bridging portion 21*d* acts with a spring to take up the difference in dimensions.

Figure 18:
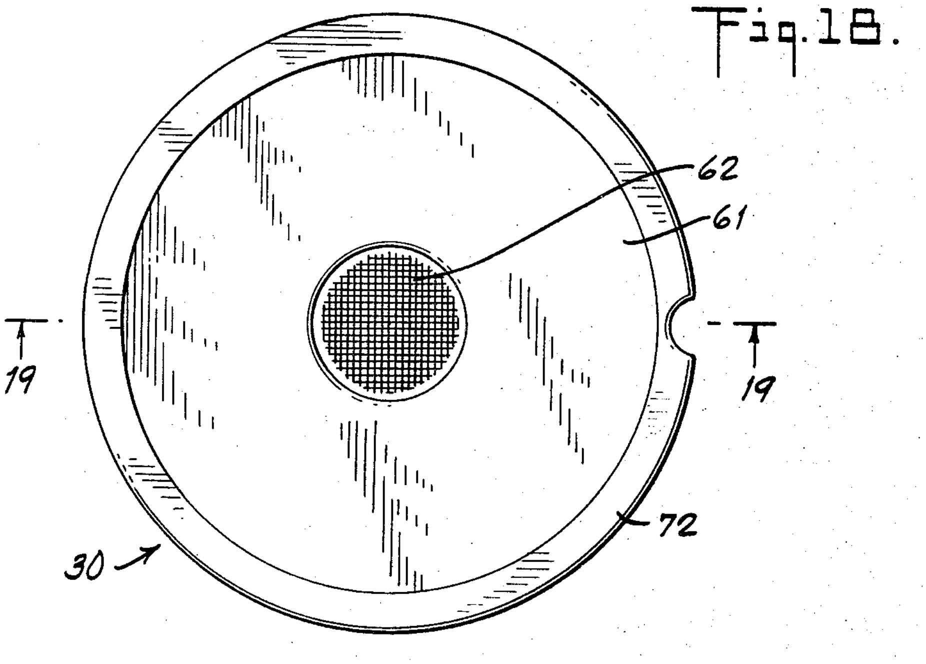
FIG. 18 is a plan view of a microphone used in the directionally sensitive transmitter assembly of FIG. 6.
Figure 19:
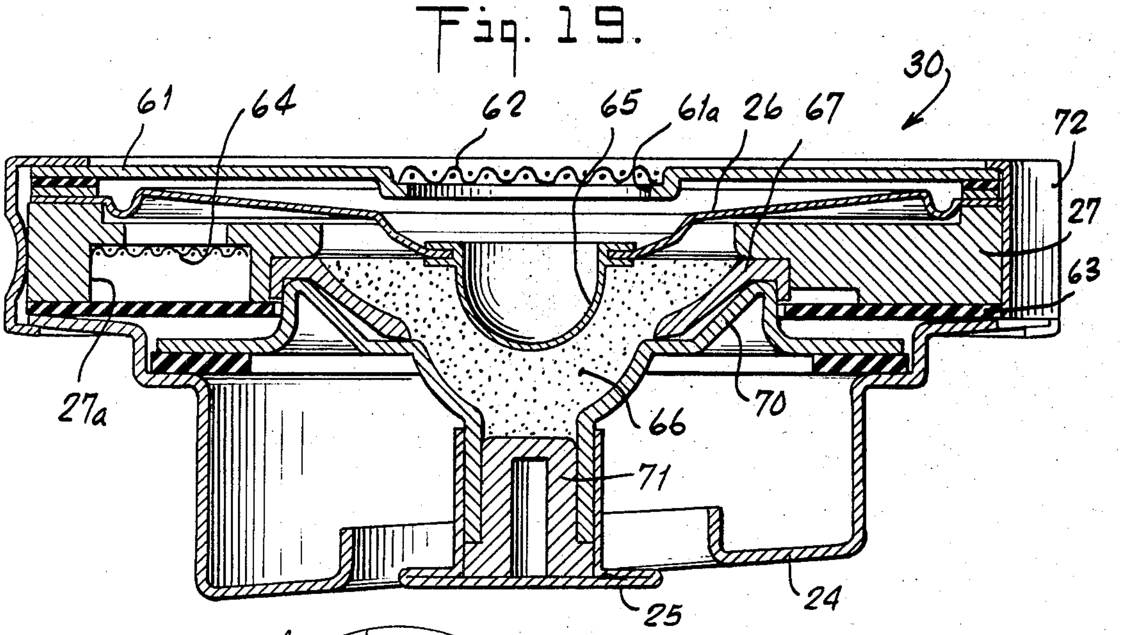
FIG. 19 is a cross-sectional view taken on the line 19—19 of FIG. 18, on an enlarged scale.

The transmitter assembly 14 includes a microphone unit 30 described in detail in connection with FIGS. 18 and 19. The microphone unit 30 includes a diaphragm 26 (see FIG. 19) which is held at its periphery on a frame 27. The vibration of the diaphragm in response to acoustical energy waves impinging on it varies the impedance between the contacts 24 and 25 and hence the current flows through the microphone unit 30. The cover 16 encloses the upper end of the microphone unit and its flange 15 is held in place on the casing 1 by means of the threaded ring 17. Attached to the bottom of the microphone unit 30 and within the cover 16 is a base ring 31 from which the flange 18 extends downwardly as an integral part thereof. The top surface of the base ring 31 is tilted at an angle with respect to its bottom surface, so that the central axis of the microphone unit 30 is tilted with respect to the cup 2, when the transmitter assembly 14 is assembled with the flange 18 projecting downwardly into the cup 2. The cover 16 and the opening 16*a* are tilted toward the mouth of the user of the handset, so that one using the handset in a normal position speaks more directly into the openings 16*a*.

The under surface of the base ring 31 is aligned with the under surface of peripheral flange 15 on the cover 16, and the cover 16 and ring 31 are bonded together, so that the microphone unit 30, cover 16 and base ring 31 make up the transmitter assembly, which is handled as a single element during its insertion into the handset 1.

The spacer 21 is made of stiffly flexible material so that it may be compressed slightly to fit within the cup 2 of handsets of various dimensions. There may be some lost motion between the ridge 2*a* at the bottom of the cup and the groove 21*a* and the bottom of the spacer 21, this lost motion is not sufficient to allow movement of the transmitter assembly 14 beyond the range of 5° on either side of its preferred noise canceling orientation.

FIGS. 10–12 AND 20

These figures illustrate how the spacer 21 cooperates with a cup 41 of slightly different structure than the cup 2 of FIGS. 1–8. The cup 41 does not have a transverse ridge such as the ridge 2*a* of FIG. 8, but instead has a projecting boss 41*a* in the bottom of the cup, which is received between two projections 21e extending inwardly from the inward surface of the spacer 21. The boss 41*a* is actually the end wall of a socket 81 for receiving an electrical connector plug, as may be readily seen in FIGS. 11 and 20. Note that the cup 41 is deeper than the cup 2, so that the spring bridge 21d in the spacer 21 is not deflected as much in FIG. 12, as it is in FIG. 11, when the transmitter assembly 14 is placed on the top of the cup 41.

Figure 20:
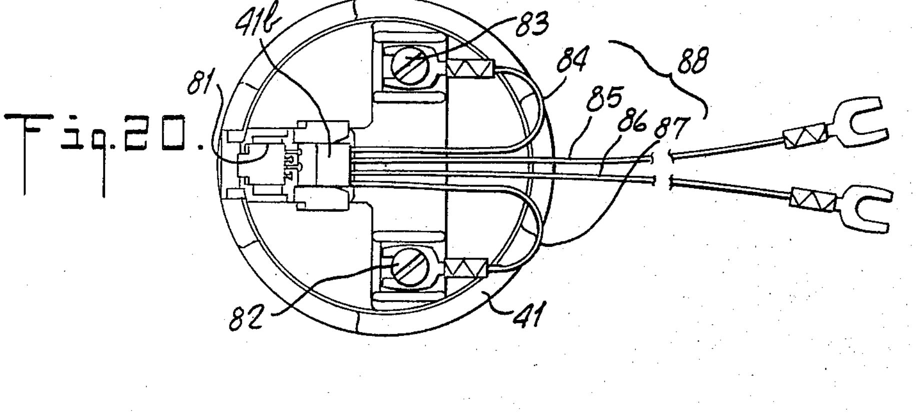
FIG. 20 is a bottom plan view of the transmitter assembly of FIG. 12.

A pair of terminals 82 and 83 extend through the bottom of the cup 41 and threadedly engage the bases of the contacts 22 and 23, respectively. A connector harness 88, shown in FIG. 20 is attached to the under side of the cup 41. The connector harness includes four wires 84, 85, 86 and 87. The wires 84 and 87 are provided with space end terminals for insertion under the heads of the screw terminals 82 and 83. At their opposite ends, the wires 84 and 87 carry pin terminals 90, fixed in suitable sockets in a block 41*b* attached to the bottom of the cup 41, as best seen at terminal 90 in FIG. 11.

The wires 85 and 86 also carry space end terminals for insertion under suitable screw terminals at the receiver end of the handset and pin terminals for insertion into the block 41*b*. The pin terminals 90 are attached to spring contact fingers, one of which is shown at 91 in FIG. 11, which extend along one wall of the socket 81 and are self-biased against a shoulder 81*a* at the bottom of the socket. By the use of this arrangement, a single four-contact plug can be inserted into the socket 81 to make all the necessary external connections to the microphone and the receiver.

FIG. 13

Figures 10, 11, 12, 13:
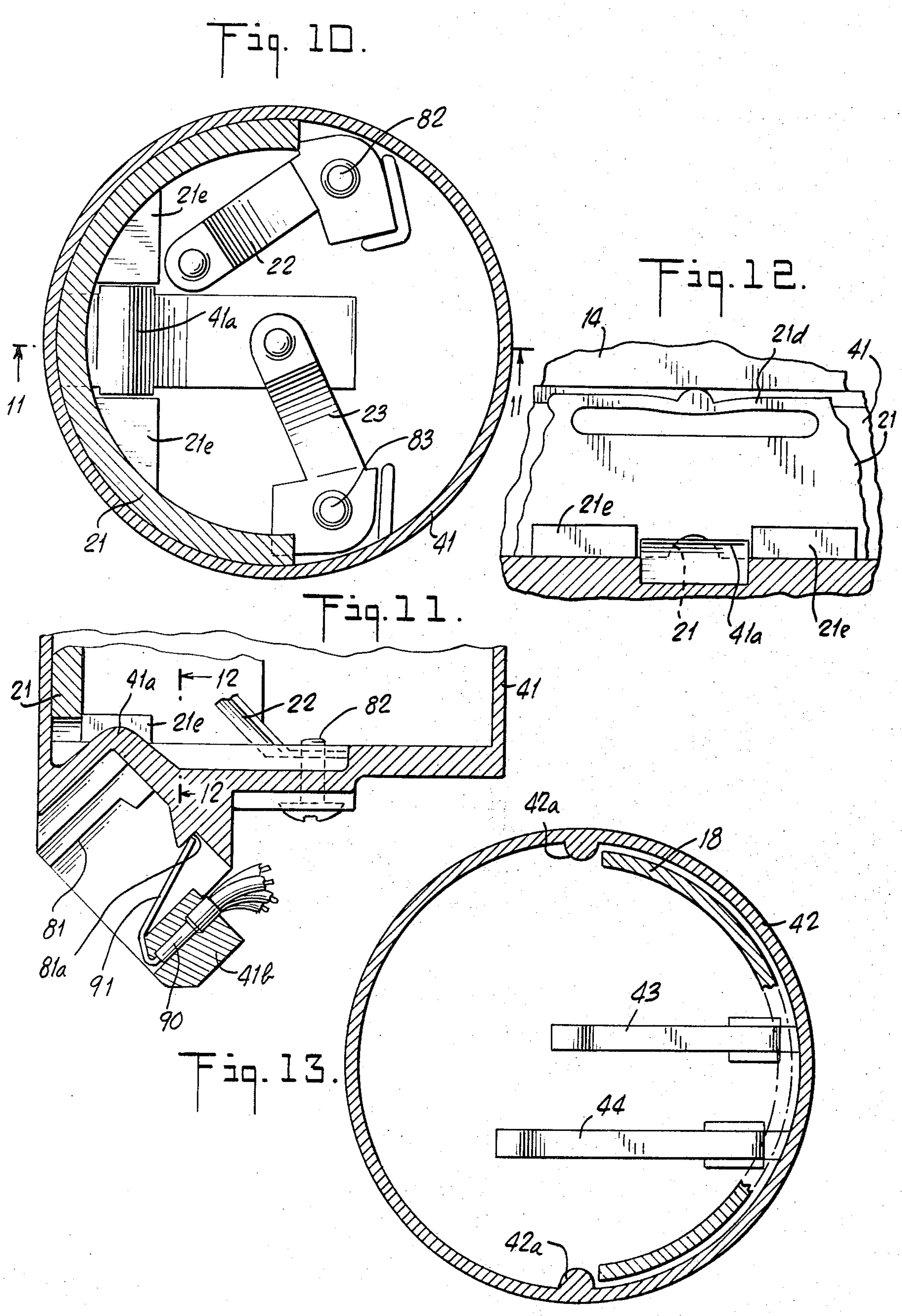
FIG. 10 is a view similar to FIG. 8, showing a modification.
FIG. 11 is a sectional view taken along the line 11—11 of FIG. 10.
FIG. 12 is a sectional view taken along the line 12—12 of FIG. 11.
FIG. 13 is a view similar to FIG. 8, showing another modification of handset structure with which the invention may be used.

This figure illustrates the use of a noise canceling transmitter in accordance with the invention in connection with still another modified form of cup, shown generally at 42. Instead of the transverse ridge 2*a* on the bottom, as shown in FIG. 8, or the raised boss 41*a* on the bottom, as shown in FIG. 11, the cup 42 is provided with a pair of axially extending ridges 42*a*, located at diametrically opposite points. In order for the flange 18 to be received between the axially extending ridges 42*a*, the flange 18 must be made somewhat shorter than a half diameter of the inside surface of the cup 42. In order that the flange 18 may be received in cups of various diameters, the flange 18 is made to fit loosely between the ridges 42*a*. The lost motion permitted between the ends of the flange 18 and the ridges 42*a* is less than the permitted maximum of 10° lost motion for the directionally sensitive transmitter assembly. Hence, the transmitter assembly is always held within 5° of the orientation where it has its optimum noise canceling function.

When the transmitter assembly 14 including the flange 18 is used with the cup 42, it is possible to place the assembly in the cup in either its correct orientation or in a diametrically opposite orientation. In the diametrically opposite orientation, it would have a reduced noise canceling function. The replacement kits containing noise canceling transmitter assemblies according to the invention are provided with instructions which should enable the user to properly assemble the transmitter assembly 14 with the cup 42.

The primary function of the orientation control means is to hold the transmitter assembly against accidental displacement from its preferred angle of orientation. The rotation of the ring 17 when it is tightened on the flange 3 tends to rotate the transmitter assembly 14, and the orientation control means including flange 18 and the ridges 42*a* prevents that rotation.

The cup 42 is provided with a pair of parallel spring contacts 43 and 44. The ends of the contacts are radially spaced, but the end of contact 43 is not exactly at the center of the cup 42. Nevertheless, the contact 25 at the bottom of the microphone unit 30 is made wide enough so that it will engage the contact 43, while the annular contact 24 engages the spring contact 44.

FIGS. 14–17

Figures 14, 15, 16, 17:
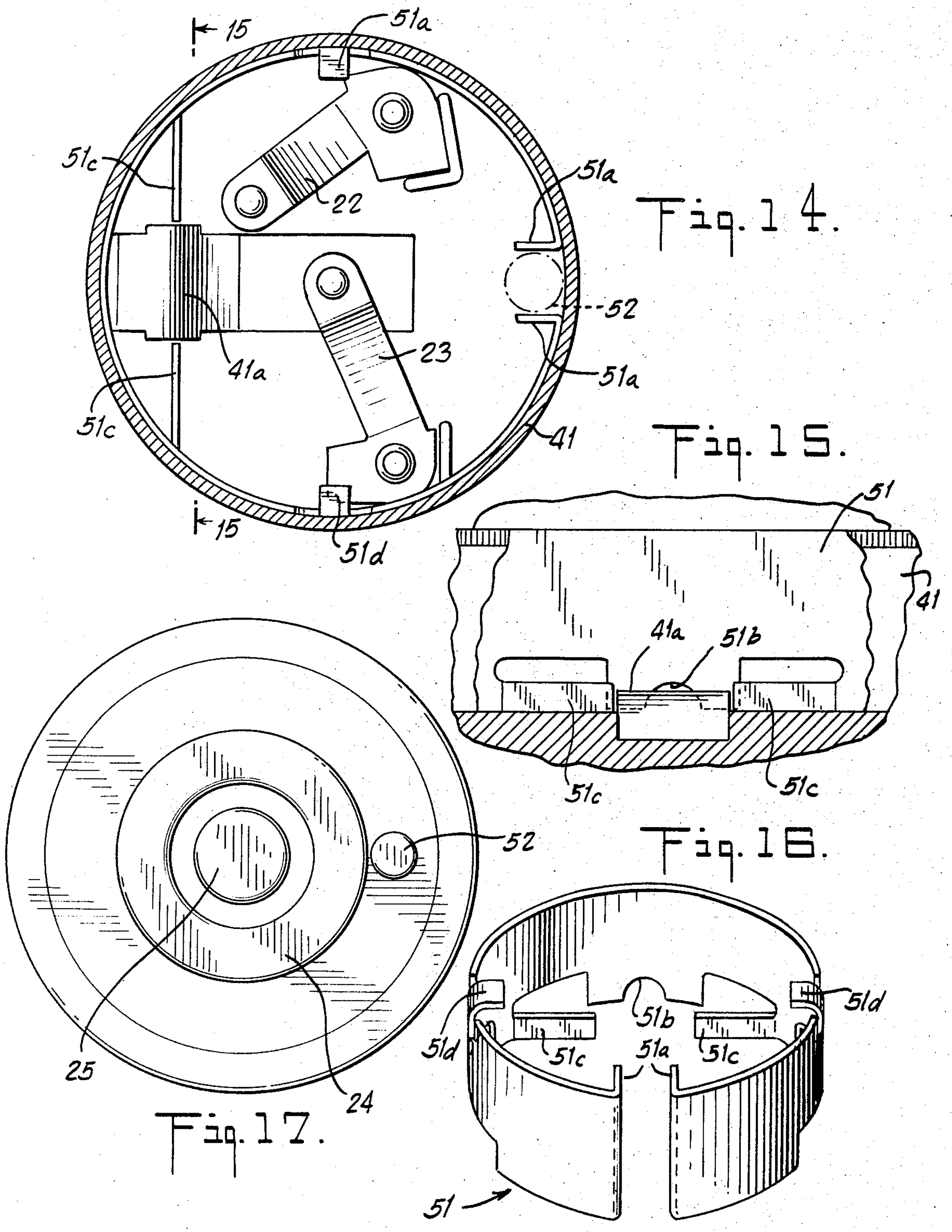
FIG. 14 is a view similar to FIG. 10, showing a modified form of orientation control spacer constructed in accordance with the invention.
FIG. 15 is a fragmentary view taken along the line 15—15 of FIG. 14.
FIG. 16 is a perspective view showing the orientation control spacer of FIGS. 14 and 15.
FIG. 17 is a bottom view of a noise canceling transmitter assembly constructed for use with the orientation control means of FIGS. 14–16.

These figures illustrate a modification of the invention in which the cup employed is the cup 41 of FIGS. 10–12 but the spacer 21 of FIGS. 1–12 is replaced by a different type of spacer generally indicated by the reference numeral 51, and shown in perspective in FIG. 16. In these figures, the extension means projecting downwardly from the transmitter assembly 14 is a post 52, best seen in FIG. 17 and shown in dotted lines in FIG. 14. The spacer 51 is a metal spring element extending almost all the way around the cup 41 and having in-turned ends 51*a*. The ends 51a are adapted to engage circumferentially opposite sides of the post 52, shown in FIG. 14. The spacer 51 is also provided in its under side with a groove 51*b* which corresponds in function to the groove 21a in the spacer 21. The ring 51 also has a pair of inwardly extending projections 51*c* which correspond in function to the projections 21*e*, as shown in FIG. 10; i.e., the projections 51c engage the sides of the boss 41a. The spacer 51 is provided with a pair of upwardly extending, bent-over fingers 51*d*, which serve as springs and correspond in function to the bridge portion 21*d* of the spacer 21 and the protuberance 21*c* which engages the transmitter assembly 14. The parts in FIGS. 14–17 other than those explicitly mentioned, correspond in structure and function to the correspondingly numbered parts in FIGS. 10–13, and will not be further described.

FIGS. 18–19

These figures illustrate the details of construction of the microphone unit 30. Except for the adaptation of the configuration of the contacts 24 and 25 to a directionally sensitive microphone, the parts of the transmitter unit 30 are conventional, and will be described only briefly.

The diaphragm 26 has its periphery clamped between a cover 61 and a base ring 27. The cover 61 has a dished central portion open at 61*a* covered by a screen 62 of suitable acoustic impedance material. The base 27 is supported on a disc 63 of insulating material and has an opening 27*a* covered by another screen of acoustic impedance material which gives access to a chamber adjacent the opposite side of the diaphragm 26. Hence, noise entering the transmitter assembly from the noise cancellation ports 14*a* can pass through the opening 27*a* and the screen 64 so that noise acts more or less equally on opposite sides of the diaphragm and does not cause it to vibrate. The diaphragm 26 supports at its center an electrode 65 which is in firm engagement with a mass 66 of variable impedance material, which may be carbon. The mass 66 is supported on an insulator ring 67 and on an electrode 70. The lower end of the electrode 70 is closed by a button 71, which is covered by the contact 25. The contact 25 has a flattened bottom end portion and an upwardly extending tubular portion which has a force fit on the outside of the button 71 and electrode 70.

The annular contact 24 is in electrical contact with a peripheral ring 72 which holds the diaphragm clamped to the other parts. The lower extension of the contact 24 has its annular surface slanted with respect to a plane perpendicular to the axis of the microphone unit 30, so that the contacting surface of contact 24 will be parallel to the flange 15 when the microphone unit 30 is assembled with the cover 16. Hence, regardless of the circumferential location of spring contact 22 in the cup, it will always engage the contact 24, and the distance between the base of the cup 2 and the contact 24 will not vary with the angular position of the contact finger 22.

It may be seen that the noise canceling transmitters illustrated are adaptable to use in handsets where the transmitter receiving cups are of various sizes, and also various shapes (compare FIGS. 6, 10 and 13). In each case, a downwardly projecting extension means on the bottom of the transmitter assembly is engaged on circumferentially opposite sides by an orientation control means, which may be ridges on the side of the cup as in FIG. 13, or it may be part of a spacer, such as the spacer 21 of FIGS. 1–8 or the spacer 51 of FIGS. 14–17. Where a spacer is used, the spacer in turn engages orientation control surfaces on the inside of the cup so as to maintain the transmitter assembly within a predetermined range of preferred noise canceling orientation.

We claim:

1. A noise canceling transmitter arrangement for use as a replacement unit in a telephone handset having an outer casing, an inner cup non-rotatably received in said casing and having inward projection means and a lip, a pair of terminals fixed on the bottom of said cup, two radially spaced spring contacts electrically connected to said terminals and projecting upwardly from the bottom of the cup, a replaceable transmitter assembly rotatably receivable in said cup and including a nondirectional microphone and a pair of coaxial contacts engaging the respective spring contacts when the transmitter assembly is received in said cup in any angular orientation with respect to the axis of the cup, and a cover threadedly engageable with said casing to hold the assembly in place in the housing with the coaxial contacts engaging the spring contacts; said noise canceling transmitter arrangement comprising:

a. a directionally sensitive transmitter assembly including:
   1. a peripheral flange for engaging the lip of the cup and the casing of the handset;
   2. extension means projecting downwardly from the bottom of the assembly and spaced radially from the axis of the cup when the peripheral flange is engaging the lip;
   3. a directionally sensitive microphone asymmetrical with respect to said axis when the flange is engaging the lip and capable of canceling ambient noise when said assembly is in a predetermined range of orientation with respect to the axis of said cup; and
   4. an annular contact with a central contact within and spaced from the annular contact, both contacts extending downwardly below said extension means and engaging the respective spring contacts when the peripheral flange is engaging the lip;

b. orientation control means to limit relative rotation of the cup and assembly so as to maintain the directionally sensitive transmitter assembly within its predetermined range of noise canceling orientation, said orientation control means including said downwardly projecting extension means on said assembly and said inward projection means on the cup; and c. a retainer ring threadedly engageable with said casing and having an inwardly projecting flange cooperating with the peripheral flange on the assembly, to hold the assembly in place in the casing.

2. A noise canceling transmitter arrangement as in claim 1, in which said orientation control menas includes a spacer contoured to fit within said cup and having surfaces interfitting with said projection means on the cup to limit angular movement of the spacer relative to the cup, said spacer also having surfaces facing circumferentially opposite sides of the extension means and effective to limit angular movement of the transmitter assembly relative to the spacer means.

3. A noise canceling transmitter arrangement as in claim 2, in which the spacer is stiffly flexible so as to be receivable in cups of somewhat different diameters.

4. A noise canceling transmitter arrangement as in claim 2, in which said spacer includes spring means extending axially of the spacer, said spring means being compressed when the spacer is captured between the bottom of the cup and the bottom of the assembly, so that the spacer is snugly receivable in cups of different depth.

5. A noise canceling transmitter arrangement as in claim 1, in which:

a. said extension means comprises a bottom flange concentric with the annular contact and extending through an arc of less than 180°.

6. A noise canceling transmitter arrangement as in claim 5, in which said inward projection means comprises two inward projections extending axially of the cup, one on each side thereof; and said bottom flange extends through an arc slightly smaller than the arcuate spacing between said two projections.

7. A noise canceling transmitter arrangement as in claim 5, in which said orientation control means includes a part cylindrical spacer having a radius substantially equal to the bottom flange on the transmitter assembly and extending through an arc of more than 180°, said spacer having surfaces interfitting with at least one inward projection on said cup so that the spacer may be seated fully in the cup in one orientation, said spacer when so seated cooperating with the ends of the bottom flange on the transmitter assembly to limit the angular orientation of the transmitter assembly, so that it may only be inserted in the cup within its predetermined range of noise canceling orientations.

8. A noise canceling transmitter arrangement as in claim 7, in which said inward projection means on the cup is a ridge extending across the bottom, and said interfitting surfaces of the spacer are the sides of a groove in the bottom of the spacer for receiving said ridge.

9. A noise canceling transmitter arrangement as in claim 7, in which said inward projection means on the cup is a raised boss on the bottom of the cup, and said interfitting surfaces on the spacer are projections extending inwardly from each side of the spacer for engaging the sides of the boss.

10. A noise canceling transmitter arrangement as in claim 1, in which said directionally sensitive transmitter assembly includes:

a. an acoustically responsive diaphragm;
b. means supporting the periphery of a diaphragm with the plane of the diaphragm tilted with respect to the plane of said peripheral flange;
c. means supporting the annular contact with a plane contact surface thereof parallel to the plane of said peripheral flange.

* * * * *

UNITED STATES PATENT OFFICE

CERTIFICATE OF CORRECTION

Patent No. 3,830,988 Dated August 20, 1974

Inventor(s) Hans Cornelis Mol et al

It is certified that error appears in the above-identified patent and that said Letters Patent are hereby corrected as shown below:

Col. 4, line 60, "space" should read -- spade --;

line 65, "space" should read -- spade --.

Col. 7, claim 1(a)(4), line 1, "with" should read -- and --;

Col. 7, claim 2, line 2, "means" is misspelled.

Signed and sealed this 12th day of November 1974.

(SEAL)
Attest:

McCOY M. GIBSON JR.
Attesting Officer

C. MARSHALL DANN
Commissioner of Patents